(12) United States Patent
Dai

(10) Patent No.: US 8,154,662 B2
(45) Date of Patent: Apr. 10, 2012

(54) TELEVISION AND METHOD FOR PROVIDING AUXILIARY INFORMATION

(75) Inventor: Lung Dai, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 553 days.

(21) Appl. No.: 12/411,410

(22) Filed: Mar. 26, 2009

(65) Prior Publication Data
US 2009/0244381 A1 Oct. 1, 2009

(30) Foreign Application Priority Data
Mar. 28, 2008 (CN) .......................... 2008 1 0300770

(51) Int. Cl.
H04N 5/50 (2006.01)
(52) U.S. Cl. .................. 348/570; 348/569; 348/731
(58) Field of Classification Search .................. 348/725, 348/570, 563, 569, 731; 725/58, 33, 108; H04N 5/44, 5/50, 5/445
See application file for complete search history.

(56) References Cited

U.S. PATENT DOCUMENTS

| 7,051,280 B1 | 5/2006 | Ko | |
| 7,324,003 B2* | 1/2008 | Yun | ................................ 725/33 |
| 2006/0156332 A1* | 7/2006 | Kendall | ........................ 348/563 |
| 2006/0181645 A1 | 8/2006 | Sarika | |

FOREIGN PATENT DOCUMENTS

| CN | 2470879 Y | 1/2002 |
| CN | 1822649 A | 8/2006 |
| JP | 02302194 A | 12/1990 |

* cited by examiner

Primary Examiner — Sherrie Hsia
(74) Attorney, Agent, or Firm — Altis Law Group, Inc.

(57) ABSTRACT

A method for outputting alert information. The method includes selecting broadcasting signals by a tuner of the television in response to channel selection signals from a microprocessor of the television; determining whether digital baseband signals being received from the tuner by the microprocessor; retrieving auxiliary data from memory of the television when the digital baseband signals are determined not being received from the tuner; and outputting alert information by an outputting means according to the retrieved auxiliary data from the memory.

14 Claims, 5 Drawing Sheets

TELEVISION AND METHOD FOR PROVIDING AUXILIARY INFORMATION

BACKGROUND

1. Technical Field

The present disclosure relates to televisions, and more particularly to a television and a method for providing video and/or audio auxiliary information when the television has reception problems.

2. Description of Related Art

When a television (TV) receives broadcasting signals, the television extracts the video and audio signals and displays the video signals on a display screen and outputs the audio signals as audio information from a speaker.

When a television displays a blank screen the viewer cannot determine if the problem lies with the TV itself or no broadcasting signal or the broadcasting signal is too weak.

Thus, the TV viewer may want to know what to do next to troubleshoot the problem. However, current televisions are not well designed with a proper way to conveniently inform the viewer on the reasons for the blank screen.

Therefore, it is desired to provide a television and method to overcome the above-described shortcomings and deficiencies.

DETAILED DESCRIPTION

Figure 1:
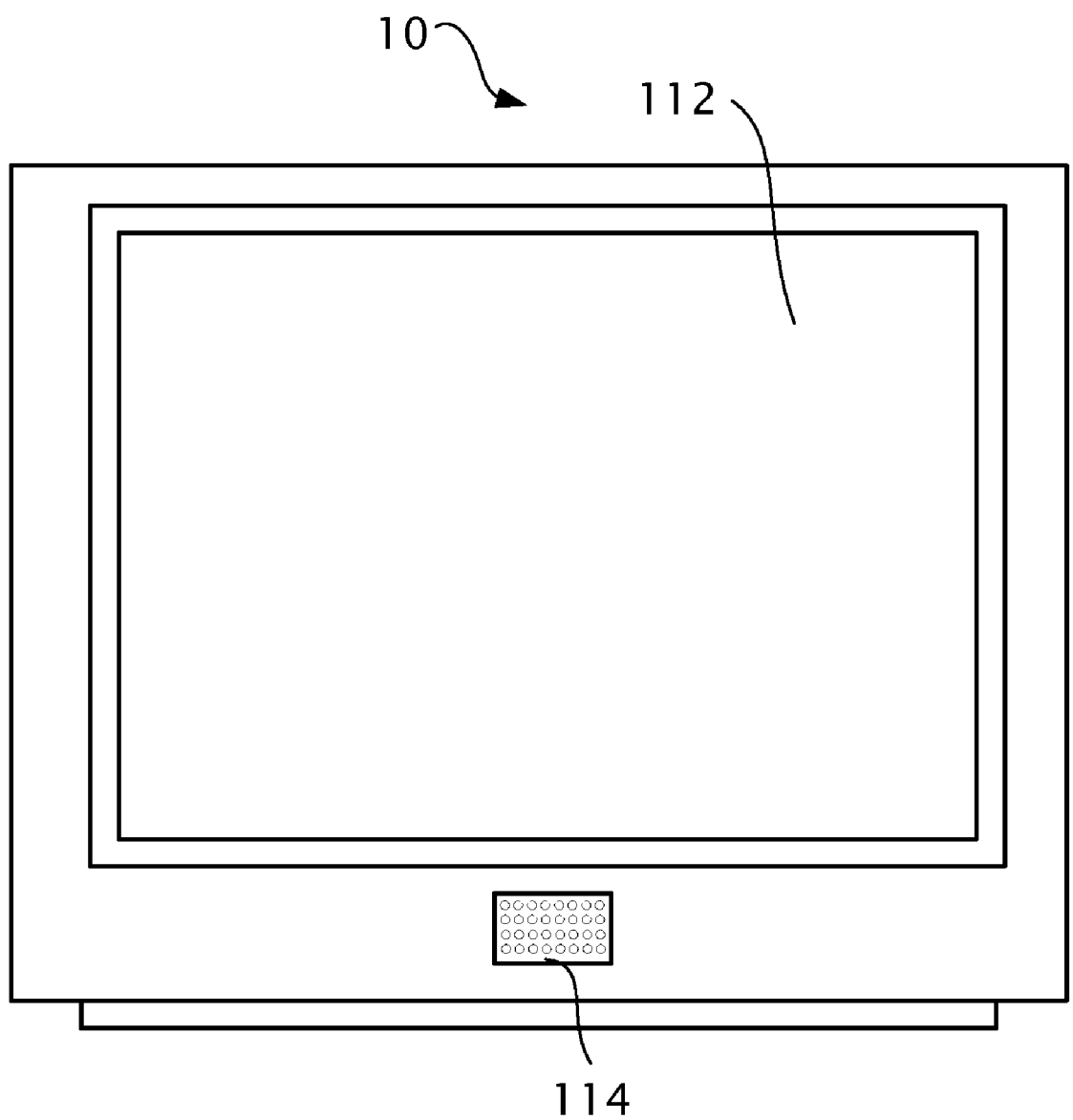
FIG. 1 is a front view of a television in accordance with an exemplary embodiment.

Referring to FIG. 1, a front view of a television 10 is illustrated. The television 10 may be a digital television configured to receive digital television signals transmitted according to industry standards including such as the advanced television systems committee (ATSC) standard, the digital video broadcasting-terrestrial (DVB-T) standard, or the integrated services digital broadcasting-terrestrial (ISDB-T) standard. The television 10 basically includes a display screen 112 and a speaker 114 for outputting video and audio information respectively.

Figure 2:
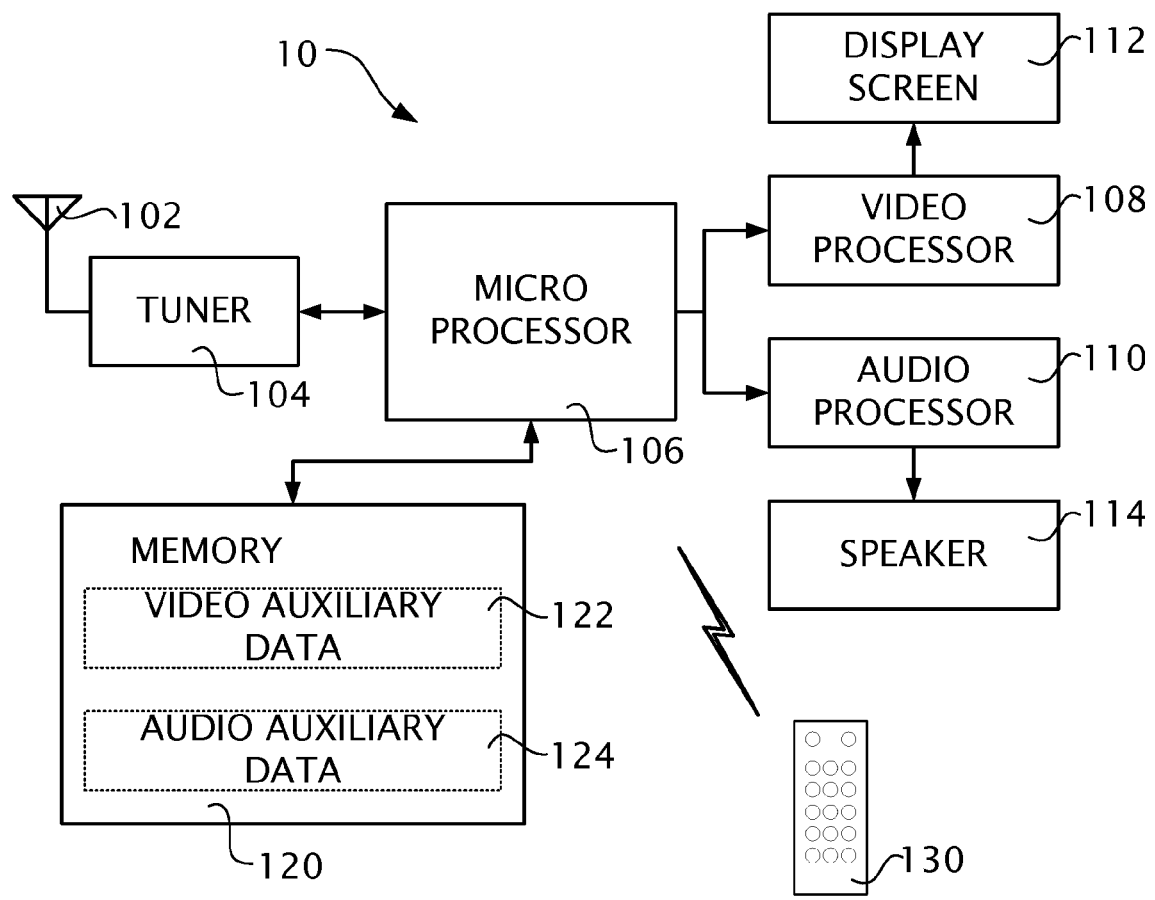
FIG. 2 is a block diagram of the television of FIG. 1 in accordance with an exemplary embodiment.

Referring to FIG. 2, a block diagram of the television 10 in accordance with an exemplary embodiment is shown. The television 10 generally includes an antenna 102, a tuner 104, a microprocessor 106, a video processor 108, an audio processor 110, a display screen 112, a speaker 114, and a memory 120.

The antenna 102 may be a digital tuner configured for receiving digital broadcasting signals. The digital broadcasting signals are transmitted in the form of electromagnetic carrier waves over the air at predetermined frequencies. The antenna 102 generates radio frequency (RF) signals based on the digital broadcasting signals.

The tuner 104 is coupled between the antenna 102 and the microprocessor 106. The tuner 104 receives channel selection signals from the microprocessor 106 in response to input commands from a remote control 130. The tuner 104 further converts selected RF signals into intermediate frequency (IF) signals, and demodulates the IF signals to generate digital baseband signals. The digital baseband signals generally include video data, audio data, and extended service data such as closed caption data.

The microprocessor 106 receives the digital baseband signals from the tuner 104, and processes the digital baseband signals to generate encoded video data and encoded audio data. The encoded video data may be encoded and/or compressed according to the MPEG-2 video standard. The encoded audio data may be encoded and/or compressed according to Dolby Digital® audio standard.

The video processor 108 decompresses and/or decodes the encoded video data from the microprocessor 106 and provides decoded video signals of a video portion of a program channel. The video portion of the program channel is displayed by the display screen 112.

The audio processor 110 decompresses and/or decodes the encoded audio data from the microprocessor 106 and provides decoded audio signals representative an audio portion of a television program. The audio portion of the program channel is output from the speaker 114.

The memory 120 may include a read only memory (ROM) for storing programs of the microprocessor 106, and a random access memory (RAM) for temporarily storing data resulting from the program execution of the microprocessor 106. The memory 120 further stores predetermined video data 122 and audio auxiliary data 124. In practice, the video auxiliary data 122 and audio auxiliary data 124 may be written into the memory 120 by the dealer/distributor and/or the manufacturer of the television 10. The video auxiliary data 122 and the audio auxiliary data 124 are created in association with a reception state of the television 10. The video auxiliary data 122 and the audio auxiliary data 124 are used to provide video alert information and audio alert information respectively to contact the dealer/distributor and/or manufacturers correspondingly to troubleshoot the reception program. It is noted that the video auxiliary data 122 and audio auxiliary data 124 can be updated via a predetermined broadcasting channel from time to time. In other embodiments, the video auxiliary data 122 and audio auxiliary data 124 can be updated via the Internet.

More specifically, when the television 10 is operated to select a program channel, the microprocessor 106 may receive an instruction input from the remote control 130, and a channel selection signal is output from the microprocessor 106 to the tuner 104. Normally, the tuner 104 tunes to the RF signals of the selected program channel, and generates digital baseband signals correspondingly. However, in some cases, the broadcasting signals may be not be available or the tuner 104 has problems tuning to the RF signals of the selected program channel. As such, the microprocessor 106 may not be able to receive digital base band signals corresponding to the selected program channel from the tuner 104. Then, the microprocessor 106 determines that the television has reception problems. In response to this determination, the microprocessor 106 retrieves the video auxiliary data 122 and the audio auxiliary data 124 from the memory 120. The microprocessor 106 transmits the retrieved video auxiliary data 122 and the audio auxiliary data 124 to the video processor 108 and the audio processor 110 respectively. The video processor 108 processes the video auxiliary data 122 received from the microprocessor 106, and displays the video alert information on the display screen 112. The audio processor 110 processes the audio auxiliary data 124 received from the microprocessor 106, and outputs the audio alert information to the speaker 114.

Figure 3:
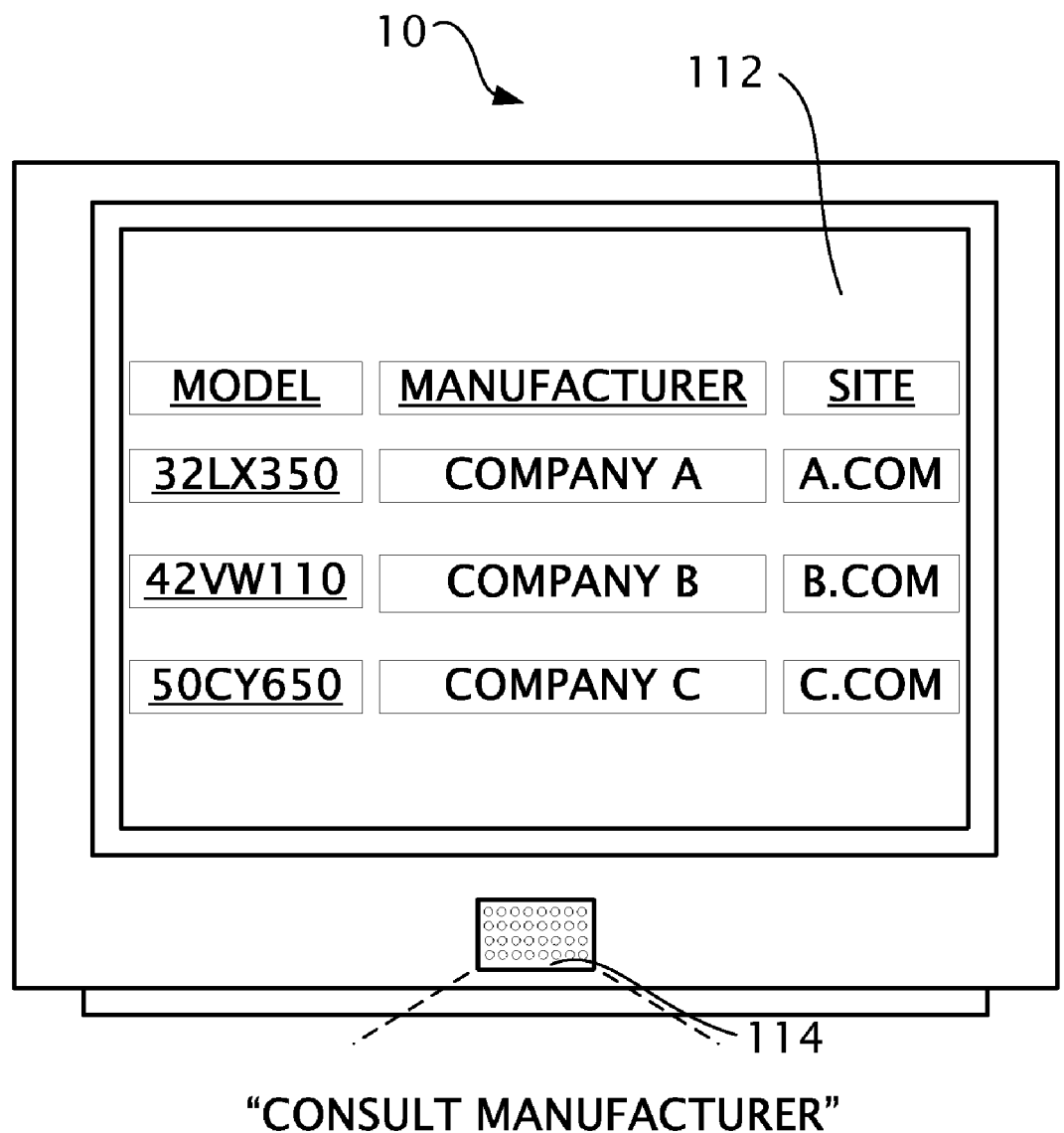
FIG. 3 is a working state of the television of FIG. 1 in accordance with an exemplary embodiment.

Referring to FIG. 3, in a first exemplary embodiment, when the television 10 is determined to have reception problems, the video alert information displayed by the display screen 112 includes contact information of a list of manufacturers. For example, the television 10 may have a model of "32LX350", which is manufactured by the manufacturer "company B" with a website of "A.COM". As such, the operator may consult the manufacturer "company B" by visiting the website "A.COM" for service. At the same time, the speaker 114 may output the audio alert information in the form of audible sounds, such as "CONSULT MANUFACTURER".

Figure 4:
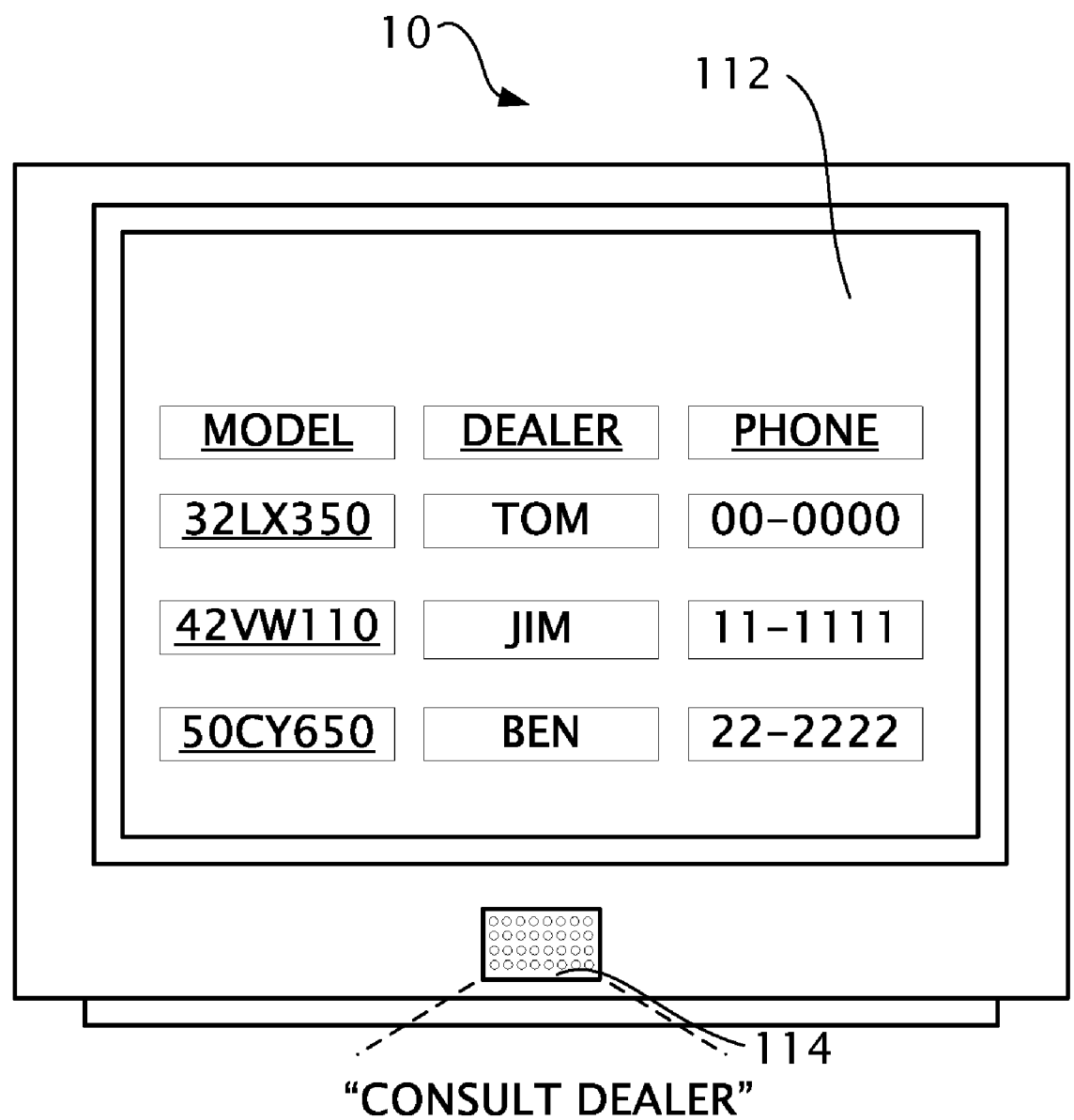
FIG. 4 is another working state of the television of FIG. 1 in accordance with an exemplary embodiment.

Referring to FIG. 4, in a second exemplary embodiment, when the television 10 is determined to have reception problems, the video alert information displayed by the display screen 112 includes contact information of a list of dealers. For example, the television 10 may have a model of "32LX350", which is sold by the dealer "TOM" having a phone number of "00-0000". As such, the operator may directly contact the dealer by make a phone call to "TOM" for service. At the same time, the speaker 114 may output the audio alert information in the form of audible sounds, such as "CONTACT DEALER".

Figure 5:
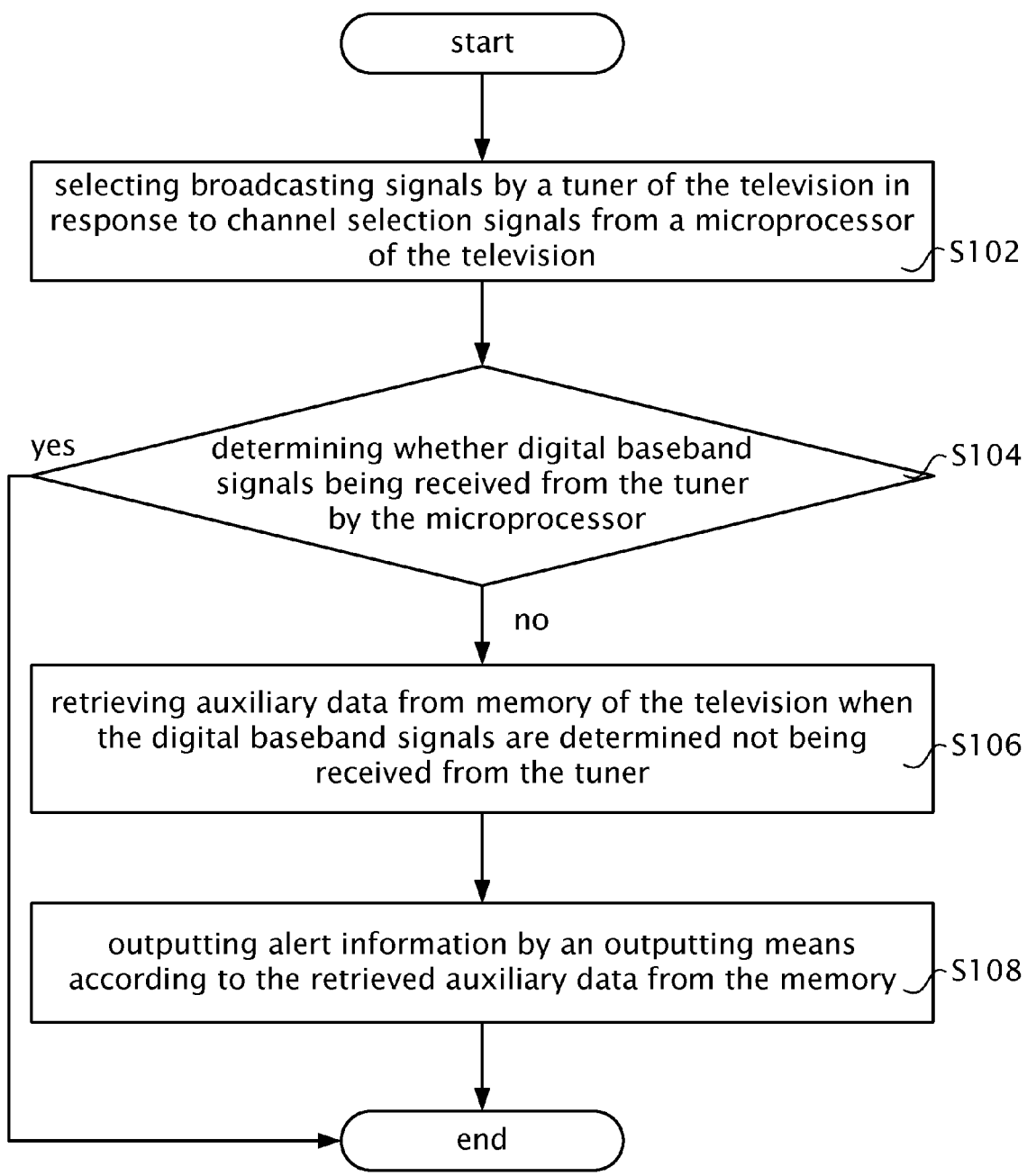
FIG. 5 is a flowchart illustrating a method for providing auxiliary information in accordance with an exemplary embodiment.

Referring to FIG. 5, in an exemplary embodiment, a flowchart illustrating a method 300 for providing video alert information or audio alert information when the television 100 is determined to have reception problems.

At block S102, the television 100 is operated to receive a television program, the tuner 104 receives selected broadcasting signals based on a channel selection signal output from microprocessor 106 in response to instructions input from a remote control 130.

At block S104, the microprocessor 106 determines whether digital baseband signals corresponding to the selected program are received from the tuner 104. The digital baseband signals may be demodulated from IF signals converted from the selected broadcasting signals. If yes, the procedure goes to end, where the selected program may be normally reproduced. If not, the procedure goes to block S106.

At block S106, the microprocessor 106 retrieves video auxiliary data 122 and audio auxiliary data 124 from the memory 120, in response to a determination that the digital baseband signals are not received from the tuner 104. The microprocessor 106 transmits the video auxiliary data 122 and the audio auxiliary data 124 to the video processor 108 and the audio processor 110 respectively.

At block S108, the video processor 108 processes the video auxiliary data 122 and causes the display screen 112 to display video alert information, and/or the audio processor 110 processes the audio auxiliary data 124 and causes the speaker 114 to output audio alert information. The video alert information and the audio alert information inform the operator to contact a dealer or a manufacturer to aid the operator to solve reception problems.

As described above, when the television 10 is determined to have reception problems in response to a channel selection signal, video alert information and/or audio alert information may be output from the display screen and the speaker respectively for informing the operator to solve the reception problems.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A television comprising:
   a tuner;
   a microprocessor operatively coupled to the tuner for outputting channel selection signals to the tuner to select broadcasting signals, the microprocessor capable of receiving digital baseband signals transmitted from the tuner;
   a memory with audio auxiliary data stored therein; and
   outputting means for outputting alert information corresponding to the audio auxiliary data retrieved from the memory;
   wherein the outputting means comprises a audio processor and a speaker, the audio auxiliary data is capable of being updated via a predetermined broadcasting channel, when the microprocessor determines that the digital baseband signals are not received from the tuner in response to the channel selection signals, the microprocessor retrieves the audio auxiliary data from the memory, and drives the outputting means to output the alert information corresponding to the retrieved audio auxiliary data to the speaker, so as to inform an operator to utilize the alert information to solve problems in selecting the program channel.

2. The television according to claim 1, wherein the memory further stores video auxiliary data, the outputting means further comprises a video processor and a display screen, when the microprocessor determines that the digital baseband signals are not received from the tuner in response to the channel selection signals, the microprocessor retrieves the video auxiliary data from the memory, and transmits the video auxiliary data to the video processor, the video processor processes the video auxiliary data, and displays the video alert information on the display screen.

3. The television according to claim 2, wherein the video auxiliary data stored in the memory is capable of being updated via a predetermined broadcasting channel.

4. The television according to claim 2, wherein the video auxiliary data includes contact information of a list of manufactures.

5. The television according to claim 2, wherein the video auxiliary data includes contact information of a list of dealers.

6. A television capable of being controlled by a remote control to select program channels for reproducing television programs, the television comprising:
   a microprocessor capable of receiving instructions from the remote control to reproduce information resulted from broadcasting signals transmitted in the program channel, the microprocessor further capable of receiving digital baseband signals converted from the broadcasting signals;
   a memory with audio auxiliary data and video auxiliary date stored therein; and
   a speaker for outputting audio alert information corresponding to the audio auxiliary data;
   a display screen for outputting video alert information corresponding to the video auxiliary data;
   wherein the video auxiliary data is capable of being updated via a predetermined broadcasting channel, when the microprocessor determines that the digital baseband signals are not received in response to instructions from the remote control, the microprocessor retrieves the audio auxiliary data from the memory, and drives the speaker to output audio alert information corresponding to the retrieved audio auxiliary data, and retrieves the video auxiliary data from the memory, and drives the display screen to output video alert information corresponding to the retrieved audio auxiliary data.

7. The television according to claim 6, further comprising: an audio processor for processing the audio auxiliary data retrieved from the memory by the microprocessor, and the audio processor outputting the audio alert information corresponding to the retrieved audio auxiliary data.

8. The television according to claim 6, further comprising: a tuner coupled to the microprocessor, the tuner capable of receiving channel selection signals from the microprocessor in response to instructions from the remote control to select the broadcasting signals, and capable of outputting digital baseband signals resulted from the broadcasting signals.

9. The television according to claim 6, further comprising a video processor for processing the video auxiliary data retrieved from the memory by the microprocessor, and causing the video processor to output the video alert information corresponding to the retrieved video auxiliary data.

10. The television according to claim 6, wherein the video auxiliary data includes contact information of a list of manufactures.

11. The television according to claim 6, wherein the video auxiliary data includes contact information of a list of dealers.

12. A method for outputting alert information, the method comprising:
   selecting broadcasting signals by a tuner of a television in response to channel selection signals from a microprocessor of the television;
   determining whether digital baseband signals being received from the tuner by the microprocessor;
   retrieving video auxiliary data from memory of the television when the digital baseband signals are determined not being received from the tuner;
   outputting alert information by an outputting means according to the retrieved video auxiliary data from the memory on the display; and
   wherein the video auxiliary data is capable of being updated via a predetermined broadcasting channel.

13. The method according to claim 12, further comprising:
   retrieving audio auxiliary data from memory when the digital baseband signals are determined not being received from the tuner; and
   outputting audio alert information by a speaker according to the retrieved audio auxiliary data from the memory.

14. The method according to claim 13, further comprising:
   receiving updated audio auxiliary data from a broadcasting channel; and
   storing the updated audio auxiliary data in the memory.

* * * * *